(12) United States Patent
Bian

(10) Patent No.: US 12,351,699 B2
(45) Date of Patent: Jul. 8, 2025

(54) DIRECT MELT-SPUN FULL-MATTE HIGH-VISCOSITY PET/LOW-VISCOSITY PET TWO-COMPONENT ELASTIC FIBER AND PREPARATION METHOD THEREFOR

(71) Applicant: JIANGSU ZHONGLU TECHNOLOGY DEVELOPMENT CORPORATION LIMITED, Suzhou (CN)

(72) Inventor: Shuchang Bian, Suzhou (CN)

(73) Assignee: JIANGSU ZHONGLU TECHNOLOGY DEVELOPMENT CORPORATION LIMITED, Suzhou (CN)

( * ) Notice: Subject to any disclaimer, the term of this patent is extended or adjusted under 35 U.S.C. 154(b) by 0 days.

(21) Appl. No.: 18/954,101

(22) Filed: Nov. 20, 2024

(65) Prior Publication Data
US 2025/0197598 A1   Jun. 19, 2025

Related U.S. Application Data

(63) Continuation-in-part of application No. PCT/CN2024/092517, filed on May 11, 2024.

(30) Foreign Application Priority Data

Dec. 13, 2023   (CN) .......................... 202311706045.6

(51) Int. Cl.
C08K 3/22       (2006.01)
C08G 63/183    (2006.01)
(Continued)

(52) U.S. Cl.
CPC .............. *C08K 3/22* (2013.01); *C08G 63/183* (2013.01); *C08G 63/87* (2013.01); *D01F 8/14* (2013.01);
(Continued)

(58) Field of Classification Search
None
See application file for complete search history.

(56) References Cited

U.S. PATENT DOCUMENTS

| | | | |
|---|---|---|---|
| 2,974,122 A | 3/1961 | Lincoln | |
| 2002/0049278 A1* | 4/2002 | Jones | ....................... C08K 3/22 524/497 |

FOREIGN PATENT DOCUMENTS

| | | |
|---|---|---|
| CN | 101126180 A | 2/2008 |
| CN | 101851812 A | 10/2010 |

(Continued)

*Primary Examiner* — Shawn Mckinnon
(74) *Attorney, Agent, or Firm* — Dinsmore & Shohl LLP

(57) ABSTRACT

The present disclosure relates to a direct melt-spun full-matte high-viscosity PET/low-viscosity PET two-component elastic fiber and a preparation method thereof. A liquid titanium dioxide matting agent containing a specific carrier is added to the elastic fiber; the carrier is a linear polyester or a small molecule ester; each end of the linear polyester contains a carboxyl functional group or a hydroxyl functional group independently, and the molecular weight of the linear polyester is 1800~2500; the small molecule ester has an ABA or BAB structure, where A is a dibasic acid, and B is a diol. When preparing the elastic fiber, prepolymer and the liquid titanium dioxide matting agent are polymerized together to prepare a high-viscosity component. By using this method, the viscosity of the high-viscosity components can be significantly improved, the quality and crimp shrinkage rate of the elastic fiber are high.

17 Claims, 2 Drawing Sheets

(51) Int. Cl.
*C08G 63/87* (2006.01)
*D01F 8/14* (2006.01)

(52) U.S. Cl.
CPC .. *C08K 2003/2241* (2013.01); *D10B 2331/04* (2013.01)

(56) References Cited

FOREIGN PATENT DOCUMENTS

| | | | |
|---|---|---|---|
| CN | 106337212 | A | 1/2017 |
| CN | 107964690 | A | 4/2018 |
| CN | 111101237 | A | 5/2020 |
| CN | 111705370 | A | 9/2020 |
| CN | 115613159 | A | 1/2023 |
| CN | 117684287 | A | 3/2024 |

* cited by examiner

DIRECT MELT-SPUN FULL-MATTE HIGH-VISCOSITY PET/LOW-VISCOSITY PET TWO-COMPONENT ELASTIC FIBER AND PREPARATION METHOD THEREFOR

CROSS-REFERENCE TO RELATED APPLICATIONS

This application is a Continuation-in-Part of PCT App. Serial No. PCT/CN2024/092517, having an International Filing Date of May 11, 2024, which claims the benefit of priority to Chinese Patent Application No. 202311706045.6 filed on Dec. 13, 2023, and the entire disclosure of both are hereby incorporated by reference.

TECHNICAL FIELD

The present disclosure relates to a direct melt-spun full-matte high-viscosity PET/low-viscosity PET two-component elastic fiber and a preparation method therefor.

BACKGROUND

The application scope of elastic fibers in the modern chemical fiber industry is becoming increasingly wide, especially in recent years, with the rapid development of two-component elastic fiber theory, there has been a deeper understanding of the forming mechanism and elasticity generation mechanism of parallel two-component elastic fibers, and the variety of elastic fibers have also made significant progress compared to the original technology. At the beginning of the 1970s, DuPont first launched the single-component elastic fiber spandex, which quickly became popular in the market with its unique style and characteristics, and in the late 1970s, they also launched the parallel two-component elastic fiber T800, which uses PBT/PET parallel composite to produce good elastic effects, however, due to the low glass transition temperature of PBT components (26~42° C.), PBT/PET elastic fibers exhibit rapid crystallization characteristic under stress, and the T800 fiber has poor elastic recovery rate and shape retention; entering the 21st century, with the successful industrialization of chemical and biological fermentation methods for PDO, PTT polyester has attracted attention for its unique molecular structure and excellent elastic recovery performance, DuPont T400, a PTT/PET two-component elastic fiber, has been launched, the PTT/PET two-component parallel composite fiber has excellent elastic recovery rate and shape retention, and will not deform after repeated stretching, its elastic slow-release effect overcomes the bound feeling of the elastic fiber spandex, and it has become the best elastic fiber variety in the fabric industry with its characteristics such as excellent resistance to chlorine bleaching and light exposure.

However, due to that the price of PTT polyester raw materials is high, PTT/PET two-component fibers are mainly used in the high-end fabric category, and for some fabrics with lower elasticity requirements, the cost-effectiveness is not outstanding, therefore, the development of two-component elastic fibers has become a key area of industry development in the past decade, the latest progress is to take advantage of the different orientation and crystallization behavior between PET polyester components with different viscosities, and use high-viscosity PET and low-viscosity PET with certain viscosity differences for parallel spinning to prepare PET/PET two-component elastic fibers, and during the spinning process, the high-viscosity component and the low-viscosity component exhibit elastic curls due to the different speed and percentage of transition from the orientation state to the crystalline state, forming a spring-like structure, thus exhibiting good elastic effect on the fabric. Patents CN111101237A, CN101126180A, CN106337212A, CN107964690A, CN101851812A, CN115613159A, etc., respectively disclose a series of methods of preparing parallel composite elastic fibers such as PET/PET, PBT/PET, PTT/PET, and methods of preparing easily or deeply dyed elastic fibers using modified PET with elastic retention, such as high-viscosity ECDP, high-viscosity high-shrinkage polyester, high-viscosity polyester easily dyed by disperse dye, high-viscosity CDP cationic polyester, etc., and low-viscosity PET polyester.

The above-mentioned preparation methods of the elastic fibers are based on the production process of chip spinning of high-viscosity chips and low-viscosity chips respectively through pre-crystallization, melting of drying screw, to composite spinning and composite parallel spinneret forming, although the basic problems of parallel composite spinning technology are solved, chip spinning technology has obvious defects such as long process, high cost, low production capacity, and poor product quality stability.

The full-matte elastic fiber product uses full-matte polyester raw material, which contains a high content of titanium dioxide matting agent, and the titanium dioxide in the titanium dioxide matting agent is an inorganic powder. The extensive addition of inorganic powder first significantly increases the level of aggregated particles formed by powder aggregation, resulting in a significant reduction in the service life of prepolymerization filters and final polymerization filters. Secondly, titanium dioxide matting agent contains a certain amount of impurities such as high-valence arsenic oxide and antimony oxide, which can increase the level of side reactions during the polymerization process, produce a large amount of noncondensable gas components, lead to poor product hue, and significantly increase vacuum load, resulting in a decrease in equipment efficiency. Finally, the matting agent contained in full-matte polyester exhibits a significant dynamic thickening phenomenon during the late stage of polymerization as the viscosity of the polymer increases, the flowability of the melt becomes worse, the material renewal efficiency on the disc of the disc reactor decreases significantly, and the residence time of the melt on the disc of the disc reactor surface increases significantly, resulting in a significant increase in the side reaction of thermal degradation, which directly leads to the production of acetaldehyde being a multiple of that produced in normal polymerization reactions, making it difficult for high viscosity polymerization reactions to be carried out stably and effectively. In the prior art, liquid titanium dioxide matting agent is used as the matting agent for polyester elastic fibers, the carrier of the liquid titanium dioxide matting agent is usually polyacrylate with low polymerization degree, medium molecular weight PEG, or inert white oil, etc., the above carrier does not react with polyester, so it is usually injected into the melt pipeline where the polymerization reaction has been completed, however, the above carrier is not well compatible with polyester, and will cause certain side reactions, resulting in a decrease in the quality of polyester hue.

SUMMARY OF THE DISCLOSURE

The purpose of the present disclosure is to provide a liquid titanium dioxide matting agent, which may further increase the viscosity of high-viscosity polyester melt, may have good compatibility with polyester fibers and ensure the quality of two-component elastic fibers when used for direct melt-spun full-matte elastic fibers with two PET components of high viscosity and low viscosity.

Another purpose of the present disclosure is to provide a direct melt-spun full-matte high-viscosity PET/low-viscosity PET two-component elastic fiber, wherein the viscosity of the high-viscosity polyester component in the elastic fiber can reach a very high level and the hue quality of the elastic fiber is obviously improved, and the crimp shrinkage rate is high.

Still another purpose of the present disclosure is to provide a method for preparing a direct melt-spun full-matte high-viscosity PET/low-viscosity PET two-component elastic fiber, this method can effectively control the viscous flow properties of the melt even when the viscosity of the high-viscosity polyester melt component is high, the apparent melting point of the melt is significantly reduced, and the residence time of the matting agent during the reaction process is greatly reduced, resulting in reduced side reactions and significantly improved polyester hue quality.

To achieve the above purpose, a technical solution employed by the present disclosure is:

A liquid titanium dioxide matting agent, is used for a full-matte PET two-component elastic fiber, the PET two-component elastic fiber contains a first PET component and a second PET component, the viscosity of the first PET component and the second PET component is different, the liquid titanium dioxide matting agent comprises titanium dioxide and a carrier; the carrier is a linear polyester or a small molecule ester; each end of the linear polyester contains a carboxyl functional group or a hydroxyl functional group independently, and the molecular weight of the linear polyester is 1800~2500; the small molecule ester has an ABA or BAB structure, where A is a dibasic acid, and B is a diol.

In the present disclosure, the ABA structure refers to both ends of the small molecule esters are diacid structures and the middle of the small molecule esters is the esterification product of A and B, and there may be multiple esterification repeating units in the middle, but the overall molecular weight is still smaller than that of prepolymer. Similarly, the BAB structure refers to both ends of the small molecule esters are diol structures and the middle of the small molecule esters is the esterification product of A and B, and there may be multiple esterification repeating units in the middle, but the overall molecular weight is still smaller than that of prepolymer.

In some implementations, the viscosity of the carrier is 2~20 Pa·s at 25° C., and 1.0~8.0 Pa·s at 60° C.

In some implementations, the small molecule ester has a melting point lower than or equal to 20° C., and a boiling point higher than or equal to 290° C.

In some implementations, the thermal weight loss of the carrier under nitrogen protection at 290° C. for 2.0 hours is less than or equal to 0.2%.

The carrier of the liquid titanium dioxide matting agent of the present disclosure is a linear polyester or small molecule ester with bifunctional groups, and when the matting agent is used for direct melt-spun full-matte elastic fibers with two PET components of high viscosity and low viscosity, the carrier may participate in the polymerization reaction of the polyester synthesis, which can improve the viscous flow properties of the polyester melt, and reduce the apparent melting point of the high-viscosity polyester melt. And in the polymerization process of polyester, due to the good compatibility between the liquid titanium dioxide matting agent and the polyester matrix, its residence time is significantly reduced, which may greatly improve the hue of the high-viscosity full-matte polyester, significantly reduce the film-drawing thickness of the liquid high-viscosity melt in the high viscosity zone, reduce the material residence time, significantly reduce side reactions, and is more conducive to the formation of the plug flow effect in the melt conveying process. Due to the use of the specific carrier mentioned above, the liquid titanium dioxide matting agent of the present disclosure can be used without the need for any other carrier or leveling agents. The linear polyester carrier has bifunctional molecular end groups, has a molecular weight of 1800~2500, which is close to the average molecular weight of the PET polyester prepolymer during the polymerization process, and after mixing with the conventional PET polyester prepolymer, they have the same probability of participating in polymerization and can successfully complete block copolymerization.

In some implementations, in percent by weight, the liquid titanium dioxide matting agent contains 20%-50% of titanium dioxide and 50%-80% of the carrier.

In some implementations, the dibasic acid is selected from the group consisting of succinic acid, glutaric acid, adipic acid, suberic acid, sebacic acid, neoglutaric acid, 1,4-cyclohexanedicarboxylic acid, phthalic acid, and combinations thereof.

In some implementations, the diol is selected from the group consisting of 1,3-butanediol, 1,4-butanediol, pentanediol, hexanediol, nonanediol, octanediol, neopentyl glycol, diethylene glycol, 1,4-cyclohexanedimethanol, and combinations thereof.

In some implementations, the linear polyester is an oligomer of a dibasic acid and a diol, the dibasic acid is selected from the group consisting of succinic acid, glutaric acid, adipic acid, suberic acid, sebacic acid, neoglutaric acid, 1,4-cyclohexanedicarboxylic acid, phthalic acid, and combinations thereof, and the diol is selected from the group consisting of 1,3-butanediol, 1,4-butanediol, pentanediol, hexanediol, nonanediol, octanediol, neopentyl glycol, diethylene glycol, 1,4-cyclohexanedimethanol, and combinations thereof.

In some implementations, the liquid titanium dioxide matting agent is prepared by dispersing, grinding, and filtering titanium dioxide and the carrier.

The present disclosure further provides a method of preparing the liquid titanium dioxide matting agent mentioned above, and the preparation method comprises a step of dispersing, grinding, and filtering titanium dioxide and a carrier to prepare the liquid titanium dioxide matting agent.

The present disclosure further provides a method of preparing a full-matte PET two-component elastic fiber, and the preparation method comprises steps of sequentially passing terephthalic acid, ethylene glycol, a catalyst, and an optional modified monomer through a first esterification reactor for a first esterification reaction, a second esterification reactor for a second esterification reaction, a first prepolymerization reactor for a first prepolymerization reaction, and a second prepolymerization reactor for a second prepolymerization reaction to obtain an ethylene terephthalate prepolymer; the preparation method further comprises steps of introducing the ethylene terephthalate prepolymer and the aforementioned liquid titanium dioxide matting agent into a high viscosity final polymerization reactor for a polymerization reaction to obtain a matte high-viscosity polyethylene terephthalate melt, and introducing the ethylene terephthalate prepolymer into a low viscosity final polymerization reactor for a polymerization reaction to obtain a low-viscosity polyethylene terephthalate melt, where the viscosity of the high-viscosity polyethylene terephthalate melt is larger than that of the low-viscosity polyethylene terephthalate melt; and a step of spanning the matte high-viscosity polyethylene terephthalate melt and the low-viscosity polyethylene terephthalate melt through the same spanning assembly to obtain the full-matte PET two-component elastic fiber.

In the present disclosure, terephthalic acid and ethylene glycol undergo the first esterification reaction and the second esterification reaction in sequence, then the first prepolymerization reaction in the first prepolymerization reactor, and the second prepolymerization reaction in the second prepolymerization reactor to obtain the ethylene terephthalate prepolymer, then the prepolymer is respectively subjected to final polymerization in the high viscosity final polymerization reactor and the low viscosity final polymerization reactor to obtain the high-viscosity polyethylene terephthalate melt and the low-viscosity polyethylene terephthalate melt, respectively, meanwhile, by introducing the aforementioned liquid titanium dioxide matting agent and the ethylene terephthalate prepolymer into the high viscosity final polymerization reactor for the final polymerization reaction, the carrier in the liquid titanium dioxide matting agent, due to its bifunctional groups, can participate in the final polymerization reaction, this ensures that even if a large amount of matting agent needs to be added for full-matte, it will not cause a decrease in the melt flowability of the high-viscosity polyethylene terephthalate melt, and then in the high viscosity final polymerization reactor for preparing high-viscosity melt, the material renewal efficiency in the polymerization reaction device is still high, which will not lead to a significant extension of the residence time of the material, thereby significantly improving the thermal degradation side reactions and ensuring the overall quality of the final full-matte PET two-component elastic fiber.

In the method of preparing a full-matte PET two-component elastic fiber of the present disclosure, a six-reactor system consisting of the first esterification reactor, the second esterification reactor, the first prepolymerization reactor, the second prepolymerization reactor, the high viscosity final polymerization reactor, and the low viscosity final polymerization reactor is adopted.

The full-matte PET two-component elastic fiber of the present disclosure contains both high-viscosity and low-viscosity components, the high-viscosity polyethylene terephthalate melt corresponds to the high-viscosity component, and the low-viscosity polyethylene terephthalate melt corresponds to the low-viscosity component. The method of preparing a full-matte PET two-component elastic fiber mentioned above is a melt direct spinning method, that is, directly using the polymerized melt for spinning, without going through the steps of cooling and chipping the melt, and then melting it for spinning.

In some implementations, in percent by weight, the PET two-component elastic fiber contains 30%-70% of the first PET component and 70%-30% of the second PET component, and the viscosity of the first PET component and the second PET component is different. The first PET component and the second PET component corresponds to the high-viscosity component and the low-viscosity component, respectively.

In some implementations, the preparation method further comprises a step of introducing a matting agent color paste into the second esterification reactor before the esterification reaction in the second esterification reactor, wherein the matting agent color paste is prepared by grinding and dispersing titanium dioxide and ethylene glycol. The matting agent color paste is an ordinary matting agent color paste in the prior art. Its usage amount may be 0.1%-0.5%, preferably 0.3%, of the mass of the melt.

In some implementations, the matte high-viscosity polyethylene terephthalate melt contains titanium dioxide in a mass percentage of 1.6% to 8.0%.

In some implementations, the preparation method further comprises a step of mixing the ethylene terephthalate prepolymer and the liquid titanium dioxide matting agent in a dynamic mixer before introducing them into the high viscosity final polymerization reactor. Mixing the two before introducing them into the final polymerization reactor may make the mixing more uniform, which is more conducive to the uniform dispersion of the liquid titanium dioxide matting agent in the prepolymer.

In some implementations, the catalyst is a supported catalyst and comprises a carrier and an active component; the carrier is selected from nano alumina or nano silica, with a particle size of 10-30 nm and a specific surface area of 200 $m^2/g$ or above; the active component is a mixture of oxides of metal M and carbonates of metal M, wherein the metal M is selected from the group consisting of vanadium, tungsten, zirconium, iron, zinc, calcium, magnesium, aluminum, titanium, cobalt, scandium, and combinations thereof.

In some implementations, the metal M is zirconium.

In some implementations, the metal M is zirconium and cobalt. Preferably, the mass of cobalt element accounts for 4%-8% of the total mass of zirconium element and cobalt element.

When synthesizing polyester with existing technology, antimony-based catalysts such as ethylene glycol antimony and antimony acetate, or titanium-based catalysts are usually adopted, and heat stabilizers and antioxidants are also used in the polymerization system, however, during the esterification and polymerization reactions, the heat stabilizers and the aforementioned antimony-based catalysts undergo precipitation reactions, forming precipitates such as antimony phosphate, which leads to the formation of a scale layer at heating medium coils for the esterification and polymerization reactions, after long-term operation of the synthesis device, the thickness of the scale layer will continue to increase, resulting in a serious decrease in the heat transfer efficiency of the reactor and a significant reduction in the operating cycle of the device. Secondly, in the high viscosity final polymerization reactor where the high viscosity polymerization reaction is carried out and the melt conveying section, reductive by-products of the high-viscosity melt cracking reaction will also reduce antimony element, forming antimony metal precipitates, resulting in the formation of antimony white metal scale layers in the melt conveying pipeline and the spinning box. Finally, full-matte polyester usually adds a high proportion of titanium dioxide matting agent, due to the use of a large amount of surface coating agents in traditional titanium dioxide matting agents such as color pastes, the coating agents can severely passivate the catalytic activity of the titanium-based catalyst, which is not conducive to the stable progress of the high viscosity polymerization reaction.

Based on this, the present disclosure adopts a supported catalyst, of which the carrier has a large specific surface area and the active component is oxides and carbonates of metals other than antimony and titanium, by using this catalyst, the catalytic conditions are mild, and it can improve the thermal stability of the melt, enhance the color of the high-viscosity polyester melt products, and reduce the level of side reactions, moreover, since the active component is a compound of active metal elements, it will not undergo precipitation reactions with phosphate ions in the heat stabilizer, or not be reduced to pure metal by the reductive groups cracked by the high viscosity polymerization reaction process, therefore, it will not cause the formation of a large number of scale layers in the polymerization device or the melt conveying section, which is conducive to the long-term operation of the device.

In some implementations, in percent by weight, the catalyst contains 94%-97% of the carrier and 3%-6% of the active component.

In some implementations, the catalyst is prepared by precipitating a carrier, a compound containing metal M element, and a precipitant, surface treating with a silane coupling agent, and calcining; the compound containing metal M element is selected from sulfates, chlorides, oxides, or hydroxides of metal M.

In some implementations, the precipitant is sodium hydroxide.

The silane coupling agent can adopt various conventional silane coupling agents.

In some implementations, the amount of the catalyst used is 260~600 ppm relative to the mass of the melt.

In some implementations, the amount of the catalyst used is 300~450 ppm relative to the mass of the melt.

In some implementations, the raw materials of the preparation method further comprise Lewis base, with a usage amount of 60~100 ppm relative to the melt.

In some implementations, the modified monomer is added to the first esterification reactor, and the modified monomer is selected from the group consisting of 1,4-cyclohexanedicarboxylic acid (CHDA), isophthalic acid, 2,6-naphthalenedicarboxylic acid, phthalic acid, trimellitic anhydride, pyromellitic acid, neoglutaric acid, furandicarboxylic acid, 2,2,4,4-cyclobutanedicarboxylic acid, 1,4-cyclohexanedimethanol, pentaerythritol, neopentyl glycol, hydroquinone, and 2,2,4,4-tetramethyl-cyclobutanedimethanol, and combinations thereof.

In some implementations, the molar amount of the modified monomer accounts for 0.5%-8.0% of the molar amount of terephthalic acid.

In some implementations, the molar amount of the modified monomer accounts for 1.0%-5.0% of the molar amount of terephthalic acid.

In some implementations, the molar amount of the modified monomer accounts for 1.5%-3.0% of the molar amount of terephthalic acid.

The polymerization monomer of the present disclosure may only comprise terephthalic acid and ethylene glycol, or the above-mentioned modified monomer may be added for modification. The above-mentioned modified monomer is a rigid copolymer monomer with greater steric hindrance, and may improve the crimp shrinkage rate and crimp stability of the final two-component elastic fiber without changing the basic physical and chemical properties of the high-viscosity and low-viscosity melt polymers, in addition, it can effectively reduce the melting point of the melt by a degree of reduction up to 5~8° C., and significantly reduce the level of side reactions at the same time, and the above-mentioned modified monomer changes the viscous flow properties of the melt, which can effectively reduce the dynamic viscosity of the high-viscosity melt, ensure a better film-forming effect of the high-viscosity melt in the first final polymerization reactor, and improve the reaction efficiency of high viscosity polymerization, and during the melt conveying process, lower dynamic viscosity may improve the kinetic energy release efficiency of macromolecular coil, and quickly form a stable plug flow.

In some implementations, the high viscosity final polymerization reactor is a horizontal polymerization reactor and comprises a main body containing a chamber internally, a feed port, and a discharging port, the main body comprises a low viscosity zone, a med-high viscosity zone, and a high viscosity zone arranged in sequence along the axial direction of the high viscosity final polymerization reactor, where the viscosity of the polyethylene terephthalate melt in the low viscosity zone, the med-high viscosity zone, and the high viscosity zone increases in sequence, the high viscosity final polymerization reactor further comprises two agitating shafts arranged in parallel along its axial direction, with rotation directions of the two agitating shafts being opposite, a plurality of agitators is respectively arranged on the two agitating shafts, the outer circumference of the agitators is circular, the agitators on the two agitating shafts are correspondingly arranged and their circular outer circumferences are in tangential contact, and the agitators in the high viscosity zone are of a twin-disc type. In the present disclosure, the twin-disc type refers to the fixed connection of two adjacent agitators with circular outer circumferences to achieve the same rotation of the two, to improve the strength of the agitators and prevent damage in high-viscosity melt environments. In the prior art, when synthesizing polyester, the conventional polymerization device in the polymerization reactor is a front-and-rear twin-shaft disc reactor, however, the high viscosity final polymerization reactor used in the present disclosure for synthesizing high-viscosity polyester adopt twin-shaft disc reactors (agitators) side-by-side and parallel arranged, and the disc reactors arranged on the twin shafts are correspondingly arranged and rotated in a tangential and reverse direction, the two can form an efficient shear effect, making the disc reactors have good self-cleaning effect, and can significantly improve the mass transfer efficiency of the raw material, accelerate the material renewal speed, and greatly shorten the residence time of the polymerization reaction, effectively reduce the level of side reactions, and greatly improve the quality of the high-viscosity full-matte polyester melt. By using the above-mentioned high viscosity final polymerization reactor of the present disclosure, the residence time of materials in the high viscosity final polymerization reactor may be reduced to 40%~55% of that in a common polymerization reactor, and the residence time may be as low as 80~120 minutes. And providing a twin-disc type disc reactor in the high viscosity zone is more helpful in solving the problem of difficult production of high viscosity full-matte polyester, which may obtain polyester melt good quality stability, significantly reduce the generation of aggregation particles in the final polymerization stage, and extend the replacement cycle of the filter upstream of the final polymerization reactor.

In some implementations, the spacing between two adjacent agitators increases sequentially from the low viscosity zone to the med-high viscosity zone, and then the high viscosity zone; the spacing between two adjacent agitators in the high viscosity zone is 8-50 mm.

In some implementations, the high viscosity final polymerization reactor further comprises a composite scraper, which comprises an axial scraper for scraping off the melt on the agitating shafts, a wall scraper for scraping off the melt on the inner wall of the high viscosity final polymerization reactor, and a disc scraper for scraping off the melt on the agitators.

In some implementations, the axial scraper ensures that the thickness of the melt on the agitating shafts does not exceed 10 mm, the wall scraper ensures that the thickness of the melt on the inner wall of the high viscosity final polymerization reactor does not exceed 10 mm, and the disc scraper ensures that the thickness of the melt on the agitators does not exceed 8 mm.

In the prior art, although conventional polymerization reactors are provided with scrapers, those scrapers have a relatively simple structure and limited effect. In the high viscosity final polymerization reactor of the present disclosure, by using the above-mentioned composite scraper, the material renewal rate on the agitators, the surfaces of the agitator shafts, and the wall of the polymerization reactor may be effectively controlled, so that the material in the three areas will not accumulate too much, effectively suppressing the problems of hue degradation and the production of a large amount of acetaldehyde in the production process of the full-matte high-viscosity melt. The disc scraper of the composite scraper of the present disclosure may control the thickness of the melt film on the discs, the wall scraper may timely renew the material on the wall of the polymerization reactor, and the axial scraper may clean the agitating shafts. By providing the aforementioned composite scraper, the residence time of materials in the high viscosity final polymerization reactor may be controlled between 80 and 120 min, which is much lower than the residence time of conventional front-and-rear twin-shaft high viscosity disc reactors, the latter is usually around 180~300 min; the significant reduction in residence time effectively reduces the level of side reactions and is beneficial for the preparation of high-viscosity full-matte polyester melt; due to the parallel twin-shaft arrangement, the full volume of the high viscosity final polymerization reactor of the present disclosure may be achieved as about half of that of a conventional final polymerization reactor.

In some implementations, there are 10-16 agitators in the high viscosity zone.

In some implementations, the high viscosity final polymerization reactor further comprises a steam feed port for introducing superheated ethylene glycol steam arranged at the top of the med-high viscosity zone and the high viscosity zone, and the preparation method further comprises steps of using a metering system to meter the superheated ethylene glycol steam and introducing the superheated ethylene glycol steam into the high viscosity final polymerization reactor. In the med-high viscosity zone and the high viscosity zone, the viscosity of the polyester melt is higher, and providing the above-mentioned steam feed port in these zones may improve the devolatilization effect, ensure good melt film-drawing effect, and control the thickness of the melt film on the disc.

In some implementations, the preparation method further comprises a step of passing the matte high-viscosity polyethylene terephthalate melt and the low-viscosity polyethylene terephthalate melt through a filter and a booster pump respectively before passing them through the same spinning assembly, and the preparation method controls the time for the matte high-viscosity polyethylene terephthalate melt to be conveyed from the high viscosity final polymerization reactor to the spinning assembly to be 30-40 min.

In some implementations, the high viscosity final polymerization reactor is arranged at the top of the spinning assembly. This can reduce the conveying distance of the high-viscosity polyester melt synthesized in the high viscosity final polymerization reactor before spinning.

In some implementations, the preparation method further comprises a step of adding a viscosity reducer to the matte high-viscosity polyethylene terephthalate melt before the matte high-viscosity polyethylene terephthalate melt passes through a filter; the viscosity reducer is selected from the group consisting of poly(ethylene terephthalate-co-1,4-cyclohexanedimethylene terephthalate) (PETG), cationic dyeable polyester (CDP), easy cationic dyeable polyester (ECDP), atmospheric pressure boiling dyeing polyester EDDP, polybutylene terephthalate (PBT), poly(trimethylene terephthalate) (PTT), and combinations thereof. The design of an additive injection system upstream of the filter during conveying the high-viscosity melt to inject a viscosity reducer, and the addition of the viscosity reducer may greatly improve the fluidity of the high-viscosity melt, enhance the stress relief effect inside the high-viscosity melt, and improve the plug flow effect, and can achieve a more stable spinning effect and increase the fiber crimp rate without affecting the basic indicators and quality of the final two-component elastic fiber product.

In some implementations, the preparation method further comprises steps of adding a solid-phase smoothing agent to the ethylene terephthalate prepolymer before introducing the ethylene terephthalate prepolymer into the high viscosity final polymerization reactor, and passing a mixture of the solid-phase smoothing agent and the ethylene terephthalate prepolymer through a filter, where the solid-phase smoothing agent is in the form of masterbatch and comprises a polyester matrix and an inorganic powder, and the inorganic powder is selected from the group consisting of talc powder, montmorillonite, barium sulfate, hydrotalcite, nano silica, and combinations thereof. The addition of the solid-phase smoothing agent may generate frictional force between the fluid surface and the pipe wall, thereby improving the fluidity of the melt and reducing the viscosity of the melt.

In some implementations, the preparation method further comprises a step of mixing the mixture of the solid-phase smoothing agent and the ethylene terephthalate prepolymer in a dynamic mixer before passing the mixture through the filter.

In some implementations, the preparation method further comprises a step of using a melt pump to convey the matte high-viscosity polyethylene terephthalate melt from the discharging port of the high viscosity final polymerization reactor to the spinning assembly, where an outlet of the melt pump is provided with a melt cooler.

In some implementations, the preparation method controls the average residence time of the high-viscosity polyethylene terephthalate melt in the high viscosity zone to be 75-120 min, and the temperature of the high-viscosity polyethylene terephthalate melt is below 284° C.

In some implementations, the preparation method further comprises a step of introducing a heat stabilizer and an antioxidant from different positions of the second esterification reactor; the heat stabilizer is selected from the group consisting of trimethyl phosphate, triethyl phosphate, triphenyl phosphate, triphenyl phosphite, triglycerol phosphate, and combinations thereof; the antioxidant is selected from the group consisting of Antioxidant 168, Antioxidant 1076, Antioxidant 1010, Antioxidant 1222, benzothiazole antioxidants, and combinations thereof.

By adding the heat stabilizer and the antioxidant in the high viscosity zone, which is the area with the highest melt viscosity, the thermal stability and antioxidant properties of the high-viscosity PET polyester melt may be improved, which can suppress side reactions during esterification and polymerization processes, achieve the suppression of viscosity reduction caused by thermal degradation of the high-viscosity melt during the residence time of 40-90 min in the melt direct spinning process, and ensure that the intrinsic viscosity level of the melt is still high in the spinning box, thereby producing sufficient elastic crimp.

In some implementations, the difference between the intrinsic viscosity of the matte high-viscosity polyethylene terephthalate melt and the intrinsic viscosity of the low-viscosity polyethylene terephthalate melt is 0.23~0.45.

In some implementations, the matte high-viscosity polyethylene terephthalate melt has an intrinsic viscosity of 0.68~0.80, and a viscosity of 550~800 Pa·s at 280-282° C.; and the low-viscosity polyethylene terephthalate melt has an intrinsic viscosity of 0.45~0.55, and a viscosity of 90~310 Pa·s at 276-277° C.

In some implementations, the intrinsic viscosity of the second PET component is 0.445~0.520; the intrinsic viscosity of the first PET component is 0.645~0.750.

In some implementations, in the same spinning assembly, the viscosity of the matte high-viscosity polyethylene terephthalate melt is 400~600 Pa·s, and the viscosity of the low-viscosity polyethylene terephthalate melt is 70~280 Pa·s.

In some implementations, the same spinning assembly is a composite spinning box.

In some implementations, the composite spinning box comprises a composite spinneret.

In some implementations, the high viscosity zone is in communication with a vacuum pump, and the preparation method controls the pressure of the high viscosity zone to 60-75 Pa. This pressure reflects a very high degree of vacuum.

In some implementations, the pumping capacity of the vacuum pump is 80~150 kg/h.

Due to the increased side reactions of materials in the high viscosity zone, the high viscosity final polymerization reactor in the device for preparing the direct melt-spun full-matte high-viscosity PET/low-viscosity PET two-component elastic fiber requires rapid devolatilization effect to quickly lead the generated gas-phase components out of the polymerization device, and the higher the viscosity at the outlet of the high viscosity final polymerization reactor, the higher the amount of noncondensable gas produced, therefore, the vacuum pump of the high viscosity final polymerization reactor requires a higher degree of vacuum. The liquid ring pump inlet of the vacuum pump may be designed with a high-capacity chilled water device to capture excess noncondensable acetaldehyde, and to further maintain production stability, all ethylene glycol extracted by the vacuum part of the device must undergo dealdehyde treatment before entering the system.

The present disclosure further provides a full-matte PET two-component elastic fiber prepared by the preparation method mentioned above.

In some implementations, the crimp shrinkage rate of the full-matte PET two-component elastic fiber is 15.0%~35.0%.

Due to the use of the above technical solutions, the present disclosure has the following advantages over the prior art:

The carrier of the liquid titanium dioxide matting agent of the present disclosure is a linear polyester or small molecule ester with bifunctional groups, and when the matting agent is used for direct melt-spun full-matte elastic fibers with two PET components of high viscosity and low viscosity, the carrier may participate in the polymerization reaction of the polyester synthesis, which can improve the viscous flow properties of the polyester melt, and reduce the apparent melting point of the high-viscosity polyester melt. And in the polymerization process of polyester, due to the good compatibility between the liquid titanium dioxide matting agent and the polyester matrix, its residence time is significantly reduced, which may greatly improve the hue of the high-viscosity full-matte polyester, significantly reduce the film-drawing thickness of the high-viscosity melt with fluidity in the high viscosity zone, reduce the material residence time, significantly reduce side reactions, and is more conducive to the formation of the plug flow effect in the melt conveying process. Due to the use of the specific matting agent mentioned above, the liquid titanium dioxide matting agent of the present disclosure can be used without the need for any other carrier or leveling agents.

In the present disclosure, terephthalic acid and ethylene glycol undergo the first esterification reaction and the second esterification reaction in sequence, then the first prepolymerization reaction in the first prepolymerization reactor, and the second prepolymerization reaction in the second prepolymerization reactor to obtain the ethylene terephthalate prepolymer, then the prepolymer is respectively subjected to final polymerization in the high viscosity final polymerization reactor and the low viscosity final polymerization reactor to obtain the high-viscosity polyethylene terephthalate melt and the low-viscosity polyethylene terephthalate melt, respectively, meanwhile, by introducing the aforementioned liquid titanium dioxide matting agent and the ethylene terephthalate prepolymer into the high viscosity final polymerization reactor for the final polymerization reaction, the carrier in the liquid titanium dioxide matting agent, due to its bifunctional groups, can participate in the final polymerization reaction, this ensures that even if a large amount of matting agent needs to be added for fully matte, it will not cause a decrease in the melt flowability of the high-viscosity polyethylene terephthalate melt, and then during the polymerization for preparing high-viscosity melt, the material renewal efficiency in the polymerization reaction device is still high, which will not lead to a significant extension of the residence time of the material, thereby significantly improving the thermal degradation side reactions and ensuring the overall quality of the final full-matte PET two-component elastic fiber.

In the present disclosure, the intrinsic viscosity of the high-viscosity melt at the outlet of the high viscosity polymerization reactor may reach 0.68~0.80, with a viscosity of 550~800 Pa·s at 280-282° C., which is much higher than the viscosity of the high-viscosity melts in the prior art. The difference in intrinsic viscosity between the high-viscosity melt at the outlet of the high viscosity polymerization reactor and the low-viscosity melt at the outlet of the low viscosity polymerization reactor may reach 0.23~0.45, which is much higher than the prior art.

In the full-matte PET two-component elastic fiber of the present disclosure, the intrinsic viscosity of the high-viscosity PET component (first PET component) may reach 0.645~0.750. The crimp shrinkage rate of the full-matte PET two-component elastic fiber may reach 35.0%, which is much higher than that of the existing two-component elastic fibers.

The industrial production of two-component elastic fibers using the preparation method of the present disclosure may achieve a production capacity of low-viscosity full-matte melts of 30,000~80,000 tons per year and a production capacity of high-viscosity full-matte melts of 30,000 to 80,000 tons per year, and when the product is direct melt-spun full-matte elastic fibers with PET/PET components of high viscosity and low viscosity, the production capacity of the comprehensive device is 60,000 to 160,000 tons per year.

Wherein, 1—low viscosity zone, 2—med-high viscosity zone, 3—high viscosity zone, 4—composite scraper, 5—disc scraper, 6—axial scraper, 7—wall scraper, 8—agitating shaft, 9—agitator, 10—first esterification reactor, 11—second esterification reactor, 12—first prepolymerization reactor, 13—second prepolymerization reactor, 14—high viscosity final polymerization reactor, 15—low viscosity final polymerization reactor, 16—pump.

DETAILED DESCRIPTION OF EXEMPLARY EMBODIMENTS

The present disclosure is further explained in detail below in combination with specific embodiments; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following embodiments, unless otherwise specified, all raw materials are basically commercially available or prepared by conventional methods in the field.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

Figure 1:
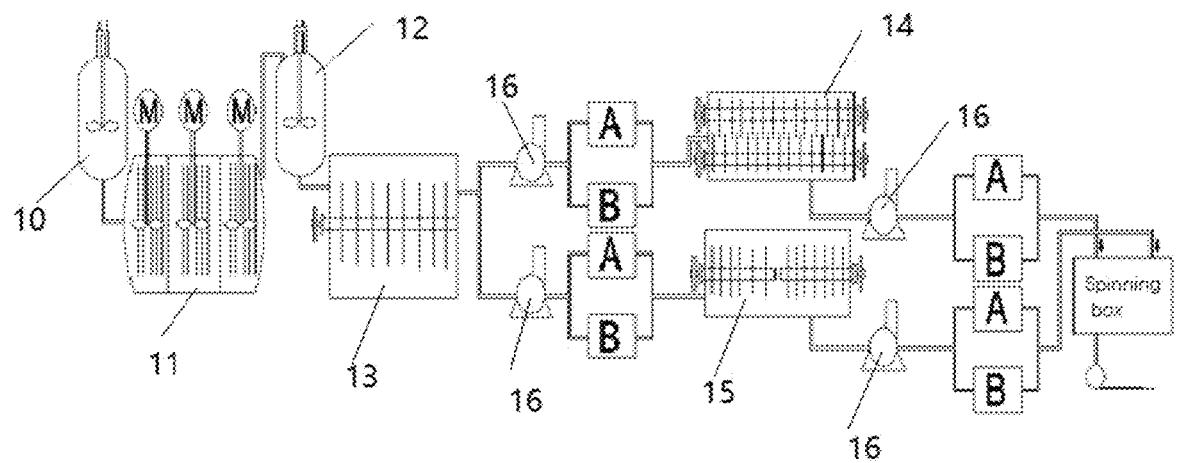
FIG. 1 is a schematic diagram of a six-reactor polymerization system used in an embodiment of the present disclosure.

As shown in FIG. 1, in this embodiment, when preparing a full-matte PET two-component elastic fiber, a six-reactor system consisting of a first esterification reactor 10, a second esterification reactor 11, a first prepolymerization reactor 12, a second prepolymerization reactor 13, a high viscosity final polymerization reactor 14, and a low viscosity final polymerization reactor 15 is adopted. The six reactors are in communication through necessary pipelines. Wherein, a pump 16 and filters A and B are provided between the second prepolymerization reactor 13 and the high viscosity final polymerization reactor 14, and in the actual production process, the filters A and B are not turned on at the same time, for example, the filter A may be turned on first, and after the device runs for a period of time, the filter B can be switched to use, at this time, the filter A can be cleaned.

Figure 2:
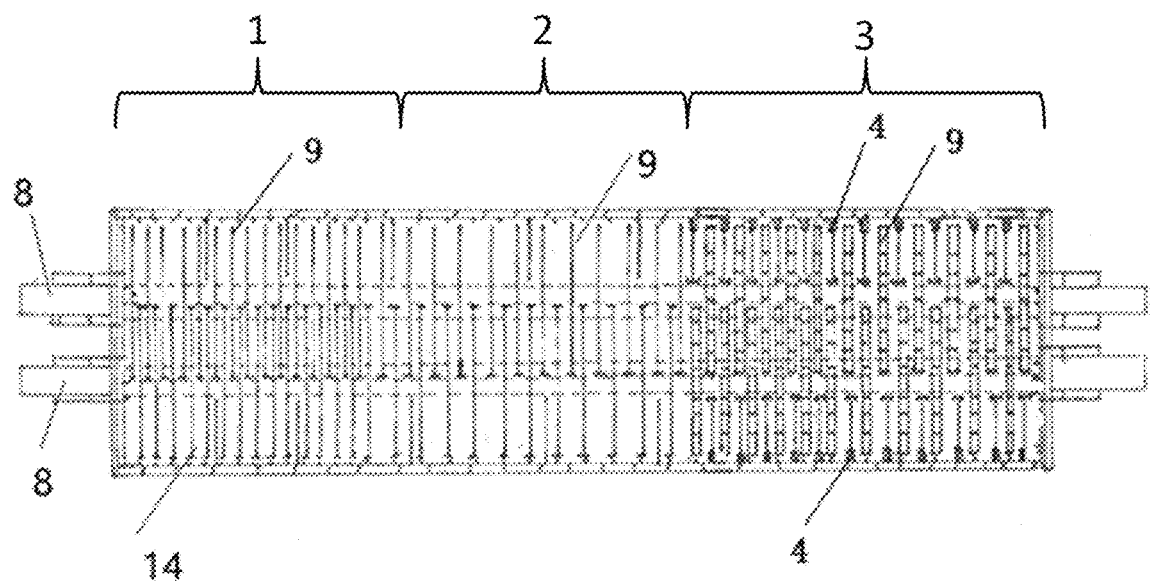
FIG. 2 is a schematic diagram of the structure of a high viscosity final polymerization reactor used in an embodiment of the present disclosure.

Wherein, as shown in FIG. 2, the high viscosity final polymerization reactor 14 is a horizontal polymerization reactor, and comprises a main body containing a chamber, a feed port, and a discharging port, the main body comprises a low viscosity zone 1, a med-high viscosity zone 2, and a high viscosity zone 3 arranged in sequence along the axial direction of the high viscosity final polymerization reactor 14, where the viscosity of the polyethylene terephthalate melt in the low viscosity zone 1, the med-high viscosity zone 2, and the high viscosity zone 3 increases in sequence (the prepolymer material undergoes continuous polymerization from the low viscosity zone 1 to the med-high viscosity zone 2, and then the high viscosity zone 3), the high viscosity final polymerization reactor 14 further comprises two agitating shafts 8 arranged parallel to its axial direction, with opposite rotation directions of the two agitating shafts 8, a plurality of agitators 9 is respectively arranged on the two agitating shafts 8, the outer circumference of the agitators 9 is circular, the agitators 9 on the two agitating shafts 8 are correspondingly arranged and their circular outer circumferences are in tangential contact, and the agitators 9 in the high viscosity zone 3 are of a twin-disc type, namely two adjacent agitators 9 are fixedly connected, the agitators 9 in the low viscosity zone 1 and the med-high viscosity zone 2 are of a single-disc type, namely two adjacent agitators 9 are not fixedly connected. The spacing between two adjacent agitators 9 increases sequentially from the low viscosity zone 1 to the med-high viscosity zone 2, and then the high viscosity zone 3; the spacing between two adjacent agitators 9 in the high viscosity zone 3 is 8-50 mm. There are 10-16 agitators 9 in the high viscosity zone 3.

Figure 3:
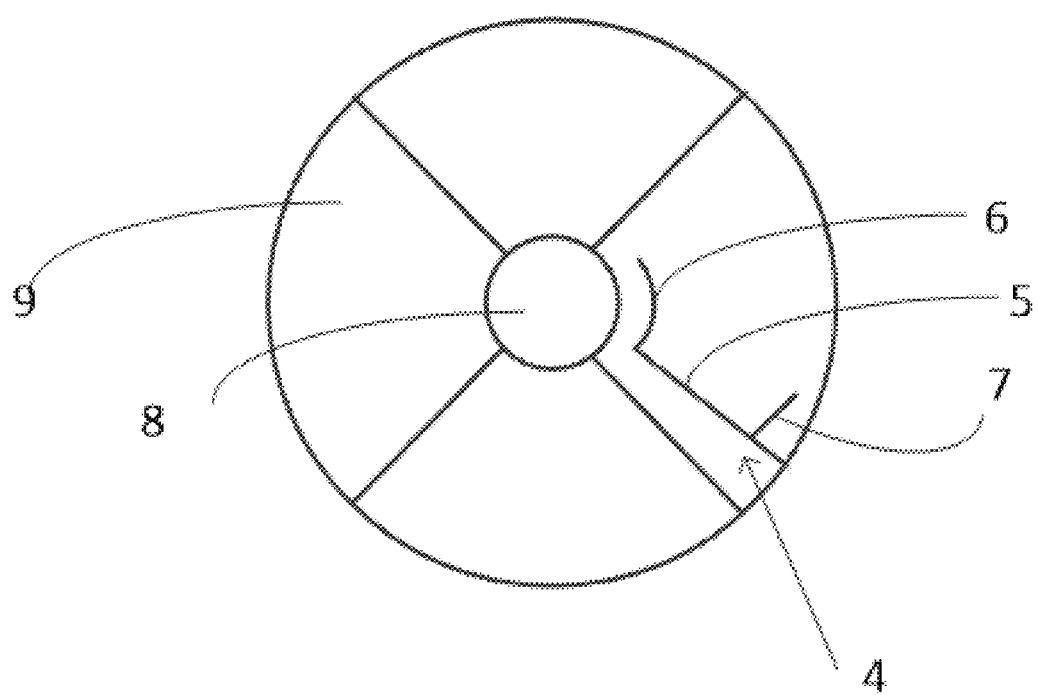
FIG. 3 is a schematic diagram of the structure of a composite scraper of the high viscosity final polymerization reactor used in an embodiment of the present disclosure.

As shown in FIG. 2 and FIG. 3, the high viscosity final polymerization reactor 14 further comprises a composite scraper 4, the composite scraper 4 comprises an axial scraper 6 for scraping off the melt on the agitating shafts 8, a wall scraper 7 for scraping off the melt on the inner wall of the high viscosity final polymerization reactor 14, and a disc scraper 5 for scraping off the melt on the agitators 9. The high viscosity final polymerization reactor 14 further comprises a steam feed port for introducing superheated ethylene glycol steam arranged at the top of the med-high viscosity zone 2 and the high viscosity zone 3.

A dynamic mixer and the filters A and B may be arranged between the second prepolymerization reactor 13 and the high viscosity final polymerization reactor 14; a liquid titanium dioxide matting agent injection system and a solid-phase smoothing agent injection system are arranged upstream of the dynamic mixer; a filter is arranged between the second prepolymerization reactor and the low-viscosity final polymerization reactor 15.

A dynamic mixer and a filter are arranged downstream of the high viscosity final polymerization reactor 14 and upstream of the same spinning assembly; a viscosity reducer injection system is arranged upstream of the dynamic mixer; a filter is arranged downstream of the low viscosity final polymerization reactor and upstream of the same spinning assembly.

Necessary melt pumps, vacuum pumps, etc. may be provided on the pipelines connecting the six reactors.

The same spinning assembly is a composite spinning box, and the high viscosity final polymerization reactor 14 is arranged at the top of the composite spinning box to shorten the conveying distance of the high-viscosity melt.

Embodiment 1

This embodiment provides a method for preparing a full-matte PET two-component elastic fiber, which comprises specific steps of: The composition of the liquid titanium dioxide matting agent was: in percent by weight percentage, titanium dioxide accounted for 20%, and the carrier accounted for 80%, where the carrier was a small molecule dibasic ester of succinic acid and 1,3-butanediol, with an ABA structure, where A was a succinic acid residue and B was a 1,3-butanediol residue. The carrier had a viscosity of 3.6 Pa·s at 25° C., and 1.0 Pa·s at 60° C., and a melting point of −23.7° C. The synthesis method and viscosity control method of the dibasic ester adopted known techniques in the existing technology. The liquid matting agent is prepared by dispersing, grinding, and filtering titanium dioxide and the carrier.

The method for preparing the catalyst used in this embodiment was as follows:

Gamma (γ) nano alumina with a specific surface area of 260 m²/g, zirconium sulfate, and a precipitant sodium hydroxide underwent a precipitation reaction and then were filtered to give a solid, which was surface treated with a silane coupling agent, calcinated to give the catalyst, where the active component of the catalyst was a mixture of zirconia and zirconium carbide, with a particle size of approximately 50 nm, and in percent by weight, the carrier nano alumina accounted for 94% and the active component accounted for 6%.

The aforementioned six-reactor polymerization device was used, and terephthalic acid, ethylene glycol, and the aforementioned catalyst were sequentially subjected to esterification reactions in the first esterification reactor 10 and the second esterification reactor 11, and prepolymerization reactions in the first prepolymerization reactor 12 and the second prepolymerization reactor 13 to give an ethylene terephthalate prepolymer, where before the esterification reaction in the second esterification reactor 11, a common matting agent color paste was introduced into it, which was prepared by grinding and dispersing titanium dioxide and ethylene glycol, where titanium dioxide accounted for 10 wt %, ethylene glycol accounted for 90 wt %, and the amount of common matting agent color paste was the corresponding titanium dioxide accounting for 0.3% of the total mass of the spinning melt. The content of the catalyst used in the PET melt is 260 ppm. Then, the ethylene terephthalate prepolymer and the aforementioned liquid titanium dioxide matting agent were mixed through a dynamic mixer, filtered through a filter, and then passed into the high viscosity final polymerization reactor 14 for polymerization reaction to give a matte high-viscosity polyethylene terephthalate melt; simultaneously, the ethylene terephthalate prepolymer was separately introduced into the low viscosity final polymerization reactor 15 for polymerization reaction to give a low-viscosity polyethylene terephthalate melt; finally, the matte high-viscosity melt and low-viscosity melt were directly fed into the composite spinning box at a mass ratio of 5:5 for spinning, resulting in a full-matte PET two-component elastic fiber, with the variety FDY and specification 55 dtex/36*f*. The amount of the liquid titanium dioxide matting agent was the corresponding titanium dioxide accounting for 1.7% of the total mass of the spinning melt.

The condition settings of the six-reactor polymerization device and the performance of the matte high-viscosity melt are shown in Table 1. Wherein, the intrinsic viscosity was tested by using a mixed solvent of phenol and tetrachloroethylene (3:2 volume ratio) for dissolving, in dL/g.

Embodiment 2

This embodiment provides a method for preparing a full-matte PET two-component elastic fiber, which was basically the same as Embodiment 1, by differing in that: in the composition of the liquid titanium dioxide matting agent, the carrier was replaced with a linear polyester of succinic acid and 1,3-butanediol, with a molecular weight of 2000, where the viscosity of the carrier was 18.0 Pa·s at 25° C., and 6.8 Pa·s at 60° C. The synthesis method and molecular weight control method of the linear polyester adopted known techniques in the existing technology.

Embodiment 3

This embodiment provides a method for preparing a full-matte PET two-component elastic fiber, which was basically the same as Embodiment 1, by differing in that: the carrier of the catalyst, nano alumina, was replaced with nano silica.

Embodiment 4

This embodiment provides a method for preparing a full-matte PET two-component elastic fiber, which was basically the same as Embodiment 2, by differing in that: the active component of the catalyst, a mixture of zirconia and zirconium carbonate, was partly replaced with a mixture of cobalt oxide and cobalt carbonate, that is, when synthesizing the catalyst, cobalt acetate was also added to the raw materials, and the mass of cobalt element in the catalyst accounted for 6% of the total mass of cobalt element and zirconium element.

Embodiment 5

This embodiment provides a method for preparing a full-matte PET two-component elastic fiber, which was basically the same as Embodiment 2, by differing in that: a viscosity reducer PETG was introduced into the polymerization device via a viscosity reducer injection system, with an intrinsic viscosity of 0.68 (measured in a mixed solvent of phenol and tetrachloroethylene in a volume ratio of 3:2), and its amount accounted for 0.75% of the total mass of the melt; a solid-phase smoothing agent, polyester masterbatch of nano barium sulfate, was introduced into the polymerization device via a solid-phase smoothing agent injection system, where the polyester was PET, the particle size of the solid-phase smoothing agent was 30~50 nm, and its amount accounted for 270 ppm of the total mass of the melt.

Embodiment 6

This embodiment provides a method for preparing a full-matte PET two-component elastic fiber, which was basically the same as Embodiment 2, by differing in that: a viscosity reducer, amorphous polyester (NPG), was introduced into the polymerization device via a solid-phase smoothing agent injection system, with an intrinsic viscosity of 0.78 (measured in a mixed solvent of phenol and tetrachloroethylene in a volume ratio of 3:2), and its amount accounted for 0.75% of the total mass of the melt; a solid-phase smoothing agent, polyester masterbatch of talc powder, was introduced into the polymerization device via the solid-phase smoothing agent injection system, where the polyester was PET, the particle size of the solid-phase smoothing agent was 100~230 nm, and its amount accounted for 270 ppm of the total mass of the melt.

Embodiment 7

This embodiment provides a method for preparing a full-matte PET two-component elastic fiber, which was basically the same as Embodiment 1, by differing in that: a viscosity reducer, amorphous polyester (NPG), was introduced into the polymerization device via a viscosity reducer injection system, with an intrinsic viscosity of 0.78 (measured in a mixed solvent of phenol and tetrachloroethylene in a volume ratio of 3:2), and its amount accounted for 0.75% of the total mass of the melt.

Embodiment 8

This embodiment provides a method for preparing a full-matte PET two-component elastic fiber, which was basically the same as Embodiment 2, by differing in that: the amount of the liquid titanium dioxide matting agent was adjusted, so that the spinning melt contained 8% of titanium dioxide by mass.

Embodiment 9

This embodiment provides a method for preparing a full-matte PET two-component elastic fiber, which was basically the same as Embodiment 2, by differing in that: the copolymer modified monomer 1,4-cyclohexanedicarboxylic acid was added into the polymerization system along with terephthalic acid and ethylene glycol, and the molar amount of 1,4-cyclohexanedicarboxylic acid was 0.5% of the molar amount of terephthalic acid.

Comparative Example 1

This comparative example provides a method for preparing a full-matte PET two-component elastic fiber, which was basically the same as Embodiment 1, by differing in that: the liquid titanium dioxide matting agent was not introduced into the polymerization system, only a common matting agent was introduced into the second esterification reactor, and its amount was the corresponding titanium dioxide accounting for 2.0% of the total mass of the melt.

Comparative Example 2

This comparative example provides a method for preparing a full-matte PET two-component elastic fiber, which was basically the same as Embodiment 1, by differing in that: in the composition of the liquid titanium dioxide matting agent, the carrier was replaced with polyacrylate with a low polymerization degree.

Comparative Example 3

This embodiment provides a method for preparing a full-matte PET two-component elastic fiber, which was basically the same as Embodiment 2, by differing in that: the catalyst was replaced with ethylene glycol antimony, so that the active metal antimony accounted for 210 ppm of the total mass of the melt.

Here is table 1:

TABLE 1

Process Conditions and Product Indicators for Embodiments 1~9 and Comparative Examples 1~3

| Experiment number | Matting agent and its content | Catalyst and its content | Viscosity reducer | Solid-phase smoothing agent | Degree of vacuum in the high viscosity reactor/ Pa | Temperature at the melt outlet of the high viscosity reactor/ °C | Conveying temperature of the melt pipeline/ °C | Melting point of chip Tm/°C | Intrinsic viscosity of the melt η | Dynamic viscosity of the melt/ Pa·s | Hue L value | b value |
|---|---|---|---|---|---|---|---|---|---|---|---|---|
| Embodiment 1 | 0.3% of common matting agent color paste + 1.7% of liquid titanium dioxide matting agent (ester) | Aluminum-based zirconium catalyst 260 ppm | Not added | Not added | 117.5 | 280.5 | 281.5 | 250.3 | 0.802 | 725~735 | 84.6 | 4.2 |
| Embodiment 2 | 0.3% of common matting agent color paste + 1.7% of liquid titanium dioxide matting agent (Oligomer with a molecular weight of 2000) | Aluminum-based zirconium catalyst 260 ppm | Not added | Not added | 125.9 | 280.9 | 281.7 | 250.4 | 0.800 | 705~715 | 83.9 | 3.8 |

TABLE 1-continued

Process Conditions and Product Indicators for Embodiments 1~9 and
Comparative Examples 1~3

| Experiment number | Matting agent and its content | Catalyst and its content | Viscosity reducer | Solid-phase smoothing agent | Degree of vacuum in the high viscosity reactor/ Pa | Temperature at the melt outlet of the high viscosity reactor/ °C | Conveying temperature of the melt pipeline/ °C | Melting point of chip Tm/°C | Intrinsic viscosity of the melt η | Dynamic viscosity of the melt/ Pa·s | Hue L value | b value |
|---|---|---|---|---|---|---|---|---|---|---|---|---|
| Embodiment 3 | 0.3% of common matting agent color paste + 1.7% of liquid titanium dioxide matting agent (ester) | Silicon-based zirconium catalyst 260 ppm | Not added | Not added | 116.3 | 281.3 | 282.5 | 250.6 | 0.801 | 725~735 | 85.2 | 4.4 |
| Embodiment 4 | 0.3% of common matting agent color paste + 1.7% of liquid titanium dioxide matting agent (Oligomer with a molecular weight of 2000) | Aluminum-based cobalt catalyst 260 ppm | Not added | Not added | 130.6 | 280.6 | 281.5 | 250.5 | 0.802 | 725~735 | 84.7 | 4.0 |
| Embodiment 5 | 0.3% of common matting agent color paste + 1.7% of liquid titanium dioxide matting agent (Oligomer with a molecular weight of 2000) | Aluminum-based zirconium catalyst 260 ppm | Viscosity of PETG: 0.68 Content: 0.75% | Polyester masterbatch of nano barium sulfate: 270 ppm | 126.0 | 280.2 | 278.4 | 249.7 | 0.760 | 650~665 | 83.9 | 3.7 |
| Embodiment 6 | 0.3% of common matting agent color paste + 1.7% of liquid titanium dioxide matting agent (Oligomer with a molecular weight of 2000) | Aluminum-based zirconium catalyst 260 ppm | Viscosity of amorphous polyester: 0.78 Content: 0.75% | Polyester masterbatch of talc powder: 270 ppm | 122.8 | 279.8 | 279.0 | 248.9 | 0.762 | 650~663 | 85.5 | 4.6 |

TABLE 1-continued

Process Conditions and Product Indicators for Embodiments 1~9 and Comparative Examples 1~3

| Experiment number | Matting agent and its content | Catalyst and its content | Viscosity reducer | Solid-phase smoothing agent | Degree of vacuum in the high viscosity reactor/ Pa | Temperature at the melt outlet of the high viscosity reactor/ °C | Conveying temperature of the melt pipeline/ °C | Melting point of chip Tm/°C | Intrinsic viscosity of the melt η | Dynamic viscosity of the melt/ Pa·s | Hue L value | b value |
|---|---|---|---|---|---|---|---|---|---|---|---|---|
| Embodiment 7 | 0.3% of common matting agent color paste + 1.7% of liquid titanium dioxide matting agent (ester) | Aluminum-based zirconium catalyst 260 ppm | Viscosity of amorphous polyester: 0.78 Content: 0.75% | Not added | 119.0 | 278.5 | 278.2 | 249.4 | 0.761 | 680~695 | 85.1 | 4.2 |
| Embodiment 8 | 0.3% of common matting agent color paste + 7.7% of liquid titanium dioxide matting agent (Oligomer with a molecular weight of 2000) | Aluminum-based zirconium catalyst 260 ppm | Not added | Not added | 127.2 | 281.2 | 282.3 | 251.0 | 0.760 | 680~695 | 84.3 | 4.8 |
| Embodiment 9 | 0.3% of common matting agent color paste + 1.7% of liquid titanium dioxide matting agent (Oligomer with a molecular weight of 2000) | Aluminum-based zirconium catalyst 260 ppm | Add 0.5% pulped CHDA | Not added | 119.6 | 281.5 | 282.0 | 250.7 | 0.750 | 710~720 | 83.6 | 4.9 |
| Comparative example 1 | 2.0% of common matting agent color paste | Aluminum-based zirconium catalyst 260 ppm | Not added | Not added | 145.2 | 285.8 | 286.0 | 254.9 | 0.760 | 780~795 | 81.8 | 7.7 |
| Comparative example 2 | 2.0% of liquid matting agent (polyacrylate with a low polymerization degree) | Aluminum-based zirconium catalyst 260 ppm | Not added | Not added | 127.2 | 282.5 | 283.5 | 253.3 | 0.798 | 755~765 | 82.6 | 6.2 |
| Comparative example 3 | 0.3% of common matting agent color paste + 1.7% of liquid titanium dioxide matting agent | Catalyst antimony element amount: 210 ppm | Not added | Not added | 133.0 | 280.6 | 281.5 | 250.5 | 0.770 | 722~735 | 84.2 | 4.0 |

TABLE 1-continued

Process Conditions and Product Indicators for Embodiments 1~9 and Comparative Examples 1~3

| Experiment number | Matting agent and its content | Catalyst and its content | Viscosity reducer | Solid-phase smoothing agent | Degree of vacuum in the high viscosity reactor/ Pa | Temperature at the melt outlet of the high viscosity reactor/ °C. | Conveying temperature of the melt pipeline/ °C. | Melting point of chip Tm/°C. | Intrinsic viscosity of the melt η | Dynamic viscosity of the melt/ Pa·s | Hue L value | b value |
|---|---|---|---|---|---|---|---|---|---|---|---|---|
| | (Oligomer with a molecular weight of 2000) | | | | | | | | | | | |

The properties of the ethylene terephthalate prepolymer, the high-viscosity melt, the low-viscosity melt, the melt in the spinning box, and the final two-component elastic fiber obtained in Embodiments 1-9 and Comparative Examples 1-3 were tested, wherein, the properties of the two-component elastic fiber were tested according to the testing standard GBT 8960-2015. The results are shown below in Tables 2-4.

TABLE 2

| | Melting point of high-viscosity chip Tm/°C. | Intrinsic viscosity at the outlet of the high viscosity final polymerization reactor | Dynamic viscosity at the outlet of the high viscosity final polymerization reactor/Pa·s | Conveying temperature of the melt/ °C. | Intrinsic viscosity at the spinning box | Dynamic viscosity at the spinning box/Pa·s | Full package rate of spinning |
|---|---|---|---|---|---|---|---|
| Embodiment 1 | 250.3 | 0.802 | 725~735 | 281.5 | 0.756 | 437 | 95.8 |
| Embodiment 2 | 250.4 | 0.800 | 705~715 | 281.7 | 0.741 | 426 | 95.2 |
| Embodiment 3 | 250.6 | 0.801 | 725~735 | 282.5 | 0.736 | 422 | 94.7 |
| Embodiment 4 | 250.5 | 0.802 | 725~735 | 281.5 | 0.696 | 407 | 93.8 |
| Embodiment 5 | 249.7 | 0.760 | 650~665 | 278.4 | 0.705 | 419 | 95.3 |
| Embodiment 6 | 248.9 | 0.762 | 650~663 | 279.0 | 0.697 | 410 | 94.1 |
| Embodiment 7 | 249.4 | 0.761 | 680~695 | 278.2 | 0.691 | 405 | 94.5 |
| Embodiment 8 | 251.0 | 0.760 | 680~695 | 282.3 | 0.680 | 398 | 93.6 |
| Embodiment 9 | 250.7 | 0.750 | 710~720 | 282.0 | 0.672 | 385 | 93.2 |
| Comparative example 1 | 254.9 | 0.760 | 780~795 | 286.0 | 0.672 | 379 | 91.6 |
| Comparative example 2 | 253.3 | 0.798 | 755~765 | 283.5 | 0.668 | 365 | 88.1 |
| Comparative example 3 | 250.5 | 0.770 | 722~735 | 281.5 | 0.679 | 396 | 91.7 |

TABLE 3

| | Intrinsic viscosity of the prepolymer | Intrinsic viscosity at the outlet of the low viscosity final polymerization reactor | Intrinsic viscosity at the outlet of the high viscosity final polymerization reactor | Intrinsic viscosity difference between the outlets of the high viscosity and low viscosity final polymerization reactors | Viscosity difference between the melts at the spinning box | Crimp shrinkage rate of the full-matte two-component elastic fibers/% |
|---|---|---|---|---|---|---|
| Embodiment 1 | 0.271 | 0.460 | 0.802 | 0.342 | 0.304 | 39.8 |
| Embodiment 2 | 0.270 | 0.462 | 0.800 | 0.338 | 0.284 | 36.9 |

TABLE 3-continued

|  | Intrinsic viscosity of the prepolymer | Intrinsic viscosity at the outlet of the low viscosity final polymerization reactor | Intrinsic viscosity at the outlet of the high viscosity final polymerization reactor | Intrinsic viscosity difference between the outlets of the high viscosity and low viscosity final polymerization reactors | Viscosity difference between the melts at the spinning box | Crimp shrinkage rate of the full-matte two-component elastic fibers/% |
|---|---|---|---|---|---|---|
| Embodiment 3 | 0.269 | 0.459 | 0.801 | 0.342 | 0.289 | 37.5 |
| Embodiment 4 | 0.270 | 0.460 | 0.802 | 0.342 | 0.244 | 33.6 |
| Embodiment 5 | 0.275 | 0.455 | 0.760 | 0.315 | 0.257 | 35.2 |
| Embodiment 6 | 0.274 | 0.453 | 0.762 | 0.309 | 0.243 | 33.5 |
| Embodiment 7 | 0.275 | 0.456 | 0.761 | 0.305 | 0.249 | 34.3 |
| Embodiment 8 | 0.275 | 0.455 | 0.760 | 0.305 | 0.232 | 32.8 |
| Embodiment 9 | 0.272 | 0.457 | 0.750 | 0.293 | 0.225 | 30.6 |
| Comparative example 1 | 0.275 | 0.460 | 0.760 | 0.300 | 0.221 | 29.7 |
| Comparative example 2 | 0.271 | 0.458 | 0.798 | 0.340 | 0.231 | 31.9 |
| Comparative example 3 | 0.274 | 0.456 | 0.770 | 0.314 | 0.219 | 28.7 |

TABLE 4

|  | Linear density/dtex | Strength/cN/dtex | Elongation/% | Oil content/% | Yarn Evenness CV/% | Boiling water shrinkage rate/% | Crimp shrinkage rate/% | Interlacing point |
|---|---|---|---|---|---|---|---|---|
| Embodiment 1 | 55.7 | 3.08 | 26.42 | 1.55 | 1.16 | 16.15 | 39.8 | 6 |
| Embodiment 2 | 55.5 | 3.01 | 27.40 | 1.57 | 1.18 | 17.53 | 36.9 | 6 |
| Embodiment 3 | 55.7 | 3.05 | 27.12 | 1.54 | 1.12 | 17.47 | 37.5 | 6 |
| Embodiment 4 | 55.6 | 2.92 | 28.38 | 1.59 | 1.16 | 18.62 | 33.6 | 6 |
| Embodiment 5 | 55.6 | 2.95 | 28.16 | 1.60 | 1.17 | 17.95 | 35.2 | 6 |
| Embodiment 6 | 55.7 | 2.88 | 28.47 | 1.59 | 1.15 | 18.68 | 33.5 | 5 |
| Embodiment 7 | 55.5 | 2.91 | 28.05 | 1.54 | 1.16 | 18.32 | 34.3 | 6 |
| Embodiment 8 | 55.6 | 2.84 | 29.32 | 1.55 | 1.17 | 18.90 | 32.8 | 6 |
| Embodiment 9 | 55.8 | 2.82 | 30.22 | 1.57 | 1.16 | 19.02 | 30.6 | 6 |
| Comparative example 1 | 55.4 | 2.88 | 30.55 | 1.64 | 1.16 | 19.22 | 29.7 | 6 |
| Comparative example 2 | 55.6 | 2.94 | 31.47 | 1.59 | 1.17 | 19.18 | 31.9 | 5 |
| Comparative example 3 | 55.6 | 2.75 | 32.16 | 1.62 | 1.15 | 19.95 | 28.7 | 6 |

As shown in Tables 1-4 above, by adding the liquid titanium dioxide matting agent with a specific composition, especially a specific carrier of the present disclosure, during the high viscosity polymerization process, the viscosity of the high-viscosity component may be increased, and the quality and crimp shrinkage rate of the final two-component elastic fiber may be improved. Moreover, by using a specific composition of supported catalysts to catalyze polymerization in the present disclosure, the performance of the high-viscosity component and the final two-component elastic fiber is further improved.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

What is claimed is:

1. A method of preparing a full-matte PET two-component elastic fiber, in percent by weight, the PET two-component elastic fiber contains 30%-70% of the first PET component and 70%-30% of the second PET component, and the viscosity of the first PET component and the second PET component is different; the preparation method comprising steps of sequentially passing terephthalic acid, ethylene glycol, a catalyst, and an optional modified monomer through a first esterification reactor and a second esterification reactor for esterification reactions, a first prepolymerization reactor and a second prepolymerization reactor for prepolymerization reactions to obtain an ethylene terephthalate prepolymer; wherein, the preparation method further comprises steps of introducing the ethylene terephthalate prepolymer and a liquid titanium dioxide matting agent into a high viscosity final polymerization reactor for a polymerization reaction to obtain a matte high-viscosity polyethylene terephthalate melt, and introducing the ethylene terephthalate prepolymer into a low viscosity final polymerization reactor for a polymerization reaction to obtain a low-viscosity polyethylene terephthalate melt, the liquid titanium dioxide matting agent consists of titanium dioxide and a carrier; the carrier is a linear polyester or a small molecule ester; each end of the linear polyester contains a carboxyl functional group or a hydroxyl functional group independently, and a molecular weight of the linear polyester is 1800~2500; the small molecule ester has an ABA or BAB structure, where A is a dibasic acid, and B is a diol; a viscosity of the carrier is 2~20 Pa·s at 25° C., and 1.0~8.0 Pa·s at 60° C.; the small molecule ester has a melting point lower than or equal to 20° C., and a boiling point higher than or equal to 290° C.; a thermal weight loss of the carrier under nitrogen protection at 290° C. for 2.0 hours is less than or equal to 0.2%; in percent by weight, the liquid titanium dioxide matting agent contains 20%-50% of titanium dioxide and 50%-80% of the carrier; where the viscosity of the matte high-viscosity polyethylene terephthalate melt is larger than that of the low-viscosity polyethylene terephthalate melt; and a step of spanning the matte high-viscosity polyethylene terephthalate melt and the low-viscosity polyethylene terephthalate melt through the same spanning assembly to obtain the full-matte PET two-component elastic fiber.

2. The preparation method according to claim 1, wherein, the preparation method further comprises a step of introducing a matting agent color paste into the second esterification reactor before the esterification reaction in the second esterification reactor, wherein the matting agent color paste is prepared by grinding and dispersing titanium dioxide and ethylene glycol.

3. The preparation method according to claim 1, wherein, the matte high viscosity polyethylene terephthalate melt contains titanium dioxide in a mass percentage of 1.6% to 8.0%.

4. The preparation method according to claim 1, wherein, the preparation method further comprises a step of mixing the ethylene terephthalate prepolymer and the liquid titanium dioxide matting agent in a dynamic mixer before introducing them into the high viscosity final polymerization reactor.

5. The preparation method according to claim 1, wherein, the catalyst is a supported catalyst and comprises a carrier and an active component; the carrier is selected from nano alumina or nano silica, with a particle size of 10-30 nm and a specific surface area of 200 m2/g or above; the active component is a mixture of oxides of metal M and carbonates of metal J\tl, wherein the metal M is selected from the group consisting of vanadium, tungsten, zirconium, iron, zinc, calcium, magnesium, titanium, cobalt, scandium, and combinations thereof.

6. The preparation method according to claim 5, wherein, in percent by weight, the catalyst contains 94%-97% of the carrier and 3%-6% of the active component.

7. The preparation method according to claim 5, wherein, the catalyst is prepared by precipitating a carrier, a compound containing metal M element, and a precipitant, surface treating with a silane coupling agent, and calcining; the compound containing metal M element is selected from sulfates, chlorides, oxides, or hydroxides of metal M.

8. The preparation method according to claim 1, wherein, the modified monomer is added to the first esterification reactor, and the modified monomer is selected from the group consisting of 1,4-cyclohexanedicarboxylic acid, isophthalic acid, 2,6-naphthalenedicarboxylic acid, phthalic acid, trimellitic anhydride, pyromellitic acid, neoglutaric acid, furandicarboxylic acid, 2,2,4,4-cyclobutanedicarboxylic acid, 1,4-cyclohexanedimethanol, pentaerythritol, neopentyl glycol, hydroquinone, and 2,2,4,4-tetramethylcyclobutanedimethanol, and combinations thereof.

9. The preparation method according to claim 8, wherein, the molar amount of the modified monomer accounts for 0.5%-8.0% of the molar amount of terephthalic acid.

10. The preparation method according to claim 1, wherein, the high viscosity final polymerization reactor is a horizontal polymerization reactor and comprises a main body containing a chamber internally, a feed port, and a discharging port, the main body comprises a low viscosity zone, a med-high viscosity zone, and a high viscosity zone arranged in sequence along the axial direction of the high viscosity final polymerization reactor, where the viscosity of the polyethylene terephthalate melt in the low viscosity zone, the med-high viscosity zone, and the high viscosity zone increases in sequence, the high viscosity final polymerization reactor further comprises two agitating shafts arranged in parallel along its axial direction, with the rotation directions of the two agitating shafts being opposite, a plurality of agitators is respectively arranged on the two agitating shafts, the outer circumference of the agitators is circular, the agitators on the two agitating shafts are correspondingly arranged and their circular outer circumferences are in tangential contact, and the agitators in the high viscosity zone are of a twin-disc type.

11. The preparation method according to claim 10, wherein, the spacing between two adjacent agitators increases sequentially from the low viscosity zone to the med-high viscosity zone, and then the high viscosity zone; the spacing between two adjacent agitators in the high viscosity zone is 8-50 mm.

12. The preparation method according to claim 10, wherein, the high viscosity final polymerization reactor further comprises a composite scraper, and the composite scraper comprises an axial scraper for scraping off the melt on the agitating shafts, a wall scraper for scraping off the melt on the inner wall of the high viscosity final polymerization reactor, and a disc scraper for scraping off the melt on the agitators; and/or, there are 10-16 agitators in the high viscosity zone.

13. The preparation method according to claim 10, wherein, the high viscosity final polymerization reactor further comprises a steam feed port for introducing superheated ethylene glycol steam arranged at the top of the med-high viscosity zone and the high viscosity zone, and the preparation method further comprises steps of using a metering system to meter the superheated ethylene glycol steam and introducing the superheated ethylene glycol steam into the high viscosity final polymerization reactor.

14. The preparation method according to claim 1, wherein, the matte high-viscosity polyethylene terephthalate melt has an intrinsic viscosity of 0.68~0.80, and a viscosity of 550~800 Pa·s at 280-282° C.; and the low-viscosity polyethylene terephthalate melt has an intrinsic viscosity of 0.45~0.55, and a viscosity of 90~310 Pa·s at 276-277° C.

15. The preparation method according to claim 1, wherein, an intrinsic viscosity of the second PET component is 0.445~0.520; an intrinsic viscosity of the first PET component is 0.645~0.750.

16. The preparation method according to claim 1, wherein, the linear polyester is an oligomer of a dibasic acid and a diol, the dibasic acid is selected from the group consisting of succinic acid, glutaric acid, adipic acid, suberic acid, sebacic acid, neoglutaric acid, 1,4-cyclohexanedicarboxylic acid, phthalic acid, and combinations thereof; the diol is selected from the group consisting of 1,3-butanediol, 1,4-butanediol, pentanediol, hexanediol, nonanediol, octanediol, neopentyl glycol, diethylene glycol, 1,4-cyclohexanedimethanol, and combinations thereof.

17. The preparation method according to claim 1, wherein, the liquid titanium dioxide matting agent is prepared by dispersing, grinding, and filtering titanium dioxide and the carrier.

* * * * *